United States Patent [19]

Clendinning et al.

[11] Patent Number: 5,037,936

[45] Date of Patent: Aug. 6, 1991

[54] BIS(ACID CHLORIDE) TERMINATED POLYARYL ETHER KETONE OLIGOMER

[75] Inventors: Robert A. Clendinning, New Providence; James E. Harris, Piscataway; George T. Kwiatkowski, Green Brook, all of N.J.; Lee P. McMaster, Brookfield, Conn.; Markus Matzner, Edison; Paul A. Winslow, Millington, both of N.J.

[73] Assignee: Amoco Corporation, Chicago, Ill.

[21] Appl. No.: 342,249

[22] Filed: Apr. 24, 1989

[51] Int. Cl.$^5$ ............... C08G 8/02; C08G 14/00; C07C 31/18
[52] U.S. Cl. .................. 528/125; 528/126; 528/128; 568/853
[58] Field of Search ............. 528/125, 126, 128; 568/853

[56] References Cited

U.S. PATENT DOCUMENTS

| 3,979,459 | 9/1976 | Rose | 568/333 |
| 4,176,222 | 11/1979 | Cinderey et al. | 528/126 |
| 4,638,044 | 1/1987 | Kelsey | 528/125 |
| 4,668,744 | 5/1987 | Matzner et al. | 528/125 |

FOREIGN PATENT DOCUMENTS

| 1930256 | 6/1969 | Fed. Rep. of Germany | 568/333 |
| 1420506 | 5/1974 | United Kingdom | 568/333 |

*Primary Examiner*—John Kight, III
*Assistant Examiner*—P. Hampton-Hightower
*Attorney, Agent, or Firm*—Frederick S. Jerome; William H. Magidson; Ralph C. Medhurst

[57] ABSTRACT

Described are crystalline block copolymers displaying high glass transition temperatures, excellent mechanical properties, excellent chemical and thermal stability, and good melt processability. These block polymers contain segments of crystalline poly(aryl ether ketones).

3 Claims, No Drawings

BIS(ACID CHLORIDE) TERMINATED POLYARYL ETHER KETONE OLIGOMER

REFERENCE TO RELATED APPLICATION

This is a division of application Ser. No. 174,849, filed 3-29-88, now U.S. Pat. No. 4,861,915, which is a division of Ser. No. 039,310, filed 4-16-87, now U.S. Pat. No. 4,786,694, which is a continuation-in-part of U.S. Ser. No. 787,122, filed 10-15-85, now U.S. Pat. No. 4,668,744, which is a continuation-in-part of Ser. No. 729,580 filed 5-2-85, now U.S. Pat. No. 4,774,296.

FIELD OF THE INVENTION

This invention is directed to novel crystalline block polymers displaying high glass transition temperatures, excellent mechanical properties, excellent chemical and thermal stability, and good melt processability. These block polymers contain segments of crystalline poly(aryl ether ketones). The invention is also directed to novel oligomers and to processes for the preparation of these oligomers, as well as to processes for the preparation of the block polymers based on these oligomers.

BACKGROUND OF THE INVENTION

Over the years, there has been developed a substantial body of patent and other literature directed to the formation and properties of poly(aryl ethers) (hereinafter called "PAE"). Some of the earliest work such as by Bonner, U.S Pat. No. 3,065,205, involves the electrophilic aromatic substitution (e.g. Friedel-Crafts catalyzed) reaction of aromatic diacylhalides with unsubstituted aromatic compounds such as diphenyl ether. The evolution of this class to a much broader range of PAE's was achieved by Johnson et al, Journal of Polymer Science, A-1, Vol. 5, 1967, pp. 2415-2427, Johnson et al, U.S. Pat. Nos. 4,108,837 and 4,175,175. Johnson et al, show that a very broad range of PAE can be formed by the nucleophilic aromatic substitution (condensation) reaction of an activated aromatic dihalide and an aromatic diol By this method, Johnson et al. created a host of new PAE's including a broad class of poly(aryl ether ketones), hereinafter called "PAEK's".

In recent years, there has developed a growing interest in PAEK's as evidenced by Dahl, U.S. Pat. No. 3,953,400; Dahl et al., U.S. Pat. No. 3,956,240; Dahl, U.S. Pat. No. 4,247,682; Rose et al., U.S. Pat. No. 4,320,224; Maresca, U.S. Pat. No. 4,339,568; Atwood et al., Polymer, 1981, Vol. 22, August, pp 1096-1103; Blundell et al., Polymer, 1983 Vol. 24, August, pp. 953-958; Atwood et al., Polymer Preprints, 20, No. 1, April 1979, pp. 191-194; and Rueda et al., Polymer Communications, 1983, Vol. 24, September, pp. 258-260. In the early to mid-1970's, Raychem Corporation commercially introduced a PAEK called STILAN, a polymer whose acronym is PEK, each ether and keto group being separated by 1,4-phenylene units. In 1978, Imperial Chemical Industries PLC (ICI) commercialized a PAEK under the trademark Victrex PEEK. As PAEK is the acronym of poly(aryl ether ketone), PEEK is the acronym of poly(ether ether ketone) in which the 1,4-phenylene units in the structure are assumed.

Thus, PAEKs are well known; they can be synthesized from a variety of starting materials; and they can be made with different melting temperatures and molecular weights. The PAEKs are crystalline, and as shown by the Dahl and Dahl et al. patents, supra, at sufficiently high molecular weights they can be tough, i.e., they exhibit high values (>50 ft-lb/in$^2$) in the tensile impact test (ASTM D-1822). They have potential for a wide variety of uses, but because of the significant cost to manufacture them, they are expensive polymers. Their favorable properties class them in the upper bracket of engineering polymers.

PAEKs may be produced by the Friedel-Crafts catalyzed reaction of aromatic diacylhalides with unsubstituted aromatic compounds such as diphenyl ether as described in, for example, U.S. Pat. No. 3,065,205. These processes are generally inexpensive processes; however, the polymers produced by these processes have been stated by Dahl et al., supra, to be brittle and thermally unstable. The Dahl patents, supra, allegedly depict more expensive processes for making superior PAEKs by Friedel-Crafts catalysis. In contrast, PAEKs such as PEEK made by nucleophilic aromatic substitution reactions are produced from expensive starting fluoro monomers and thus would be classed as expensive polymers.

In all of the above described U.S. Patents, the copolymers that are described are random or ordered copolymers characterized in that all of the repeat units of the polymer are derived from monomers and are typically distributed randomly along the polymeric chains.

European Patent Application 125,816, filed Apr. 19, 1984, based for priority upon British patent Application 8,313,110, filed May 12, 1983, is directed to a method for increasing the molecular weight by melt polymerization of a poly(aryl ether) such as PEEK.

The process of European Patent Application 125,816, provides a basis by melt polymerization above the crystalline melting point of the poly(aryl ether) to increase the molecular weight by chain extension of polymer blocks. The application theorizes that the procedure can be used for making the block copolymers described in U.S. Pat. No. 4,052,365 and 4,268,635. Implicit problems associated in the process of this application are the difficulty in controlling the molecular weight of the resulting polymer and/or limiting isomerization and the problems associated with branching. The process of this European application would appear to be advantageous in making composites where the linearity and solution properties of the final polymer are not so critical.

PAEK block copolymers have been described in U.S. Pat. Nos. 4,052,365 and 4,268,635. U.S. Pat. No. 4,052,365 describes random or block copolymers having repeating units of the structure —Ar—O—Ar—CO— and —Ar—O—Ar—SO$_2$—. The patent states that these block copolymers are crystalline. U.S. Pat. No. 4,268,635 describes a process for preparing polymers containing —Ar—O—Ar—CO— and —Ar—O—Ar—SO$_2$— units which the patentee believes to contain block structures. The patent states that the polymers are crystalline and exhibit improved high temperature properties compared with totally random copolymers of similar composition. However, the block copolymers in said patents require units with —SO$_2$— linkages. The —SO$_2$— linkage tends to break up the crystallinity of the polymer which results in inferior properties as compared to polymers which do not contain the —SO$_2$— linkage but have ether and/or keto groups instead Due to the amorphous nature of the sulfonyl containing component used in making these prior art block copolymers, lower rates of crystallization are induced and hence, their commercial utility is less than desirable. The —SO₂— component so adversely affects the crystallinity properties that there is a maximum limit in the $T_m$, far below that for the block polymers of this invention. A further deficiency of these prior art block copolymers is that they cannot be used to form compatible blends with other PAEKs.

U.S. patent application Ser. No. 729,580 now U.S. Pat. 4,774,296 filed on May 2, 1985, in the names of R..A. Clendinning et al., titled "Block Polymers Containing a Poly(Aryl Ether Ketone) and Methods for Their Production", commonly assigned, describes a family of novel aryl ether ketone block copolymers. The blocks of the subject patent application contain essentially ether groups (—O—) joined to keto groups (—CO—) through 1,4-phenylene groups. The block copolymers in question are tough materials, that are easy to fabricate; their thermal and chemical resistance are excellent. However, their glass transition temperatures are rather low for some applications; they are generally in the range of about 150° to about 160° C. In some applications, such as in composites for example, a highly stable and tough matrix having a high glass transition temperature is required. This is due to the fact that polymers, even crystalline polymers, exhibit an excessive loss of modulus, strength and creep resistance above their Tg's. This loss in properties may not be acceptable in cases where the materials are to be used as thermoplastic matrix resins. Hence, the preparation of poly(aryl ether ketones) combining their generally excellent properties with high glass transition temperatures is of great practical importance. Such high Tg block and extended copolymers are described herein.

THE INVENTION

This invention comprises solution-polymerized block polymers wherein the components of the block structure are tough, crystalline poly(aryl ether ketone)s (PA-EK's). The blocks contain essentially ether groups (—O—) joined to keto groups (—CO—) through units of the formulae (1), (2), (3) and/or (4). In addition to units (1), (2), (3) and/or (4),

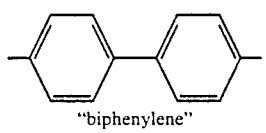
"biphenylene" (1)

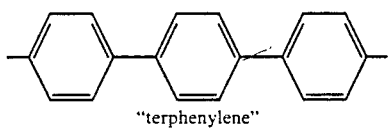
"terphenylene" (2)

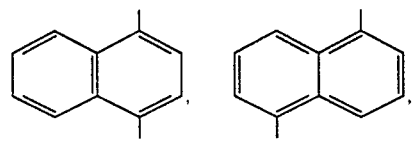
hereinafter referred to as "naphthylene" (3)

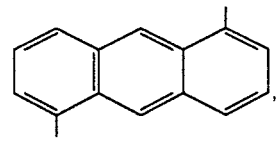
, (4)

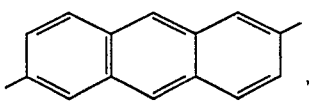
,

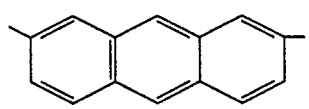
hereinafter referred to as "anthracenylene"

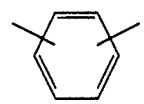
(5)

the ether (—O—) and keto (—CO—) groups may also be joined through 1,4- or 1,3-phenylene groups (5). This invention is also directed to monomers and oligomers which are suitable for making the block copolymers. Also, this invention is directed to methods for making the monomers, the oligomers and the block copolymers.

The introduction of units (1), (2), (3) and/or (4) was found to have a dramatic effect upon the glass-transition temperature of the poly(aryl ether ketone) block and chain-extended copolymers. The higher the weight percentage of units (1), (2), (3) and/or (4) in the copolymer, the higher is its Tg. Unexpectedly, the effect of units (1), (2), (3) and/or (4) upon the crystallization behavior of the novel block and extended copolymers, is negligible.

The block polymers of this invention are tough, crystalline and have a good combination of physical and mechanical properties.

The block is bonded to another block of the same or different composition through one or more of an ether group, a keto group, or a divalent copolymeric chain extending unit. In the case where the blocks are the same, bonding is effected through a divalent monomer, dimer unit, or oligomeric unit connecting the blocks through ether groups to produce a copolymeric structure. In the preferred embodiment, with the possible exception of when the blocks are connected through a divalent chain extending single unit, the poly(aryl ether ketone) comprises essentially ether and keto groups joined through units of the formulae (1), (2), (3) and/or 4,and in addition, optionally through units (5). The block polymers of this invention preferably have a reduced viscosity of at least 0.9 dl/g as measured in sulfuric acid at 20° C. (concentration of 1 gm/100 ml).

The solution-polymerized polymers of this invention contain oligomeric blocks that are interconnected. The oligomeric blocks are homopolymers and copolymers having a chain length such that the number of mers therein is at least two, and in some instances, as discussed below, greater than at least 3.

If two or more different oligomeric blocks are directly interconnected the polymers of this invention fall into the category of block polymers as defined in polymer chemistry. The polymers as defined herein can also contain two or more similar or identical blocks connected by a monomeric or oligomeric coupling unit, with the proviso that when the blocks are identical, the coupling unit must be copolymeric. As a result, by reason of the coupling unit, the final material is a copolymer even though identical blocks are being joined.

In more specific terms, this invention comprises two classes of solution-polymerized block polymers, to wit, block copolymers and chain extended copolymers In the case of the block copolymers, they are of the classical A-B, A-B-A, (AB)$_n$, A-B-C, etc., types. The chain extended copolymers are typically characterized by the structure A-x-A-x- wherein A is a block unit, all the A's can be the same or different and x is the chain extending monomer or dimer. When x is a large unit, for example, an oligomer, then for the purposes of this invention, the polymer would be classed a block copolymer. Further, x and A must be different structural units.

Block units, according to this invention, comprise oligomeric size structures, i.e., structures which contain at least two monomer units in sequence. Chain extending units comprise structures which are smaller than oligomeric, i.e., they are preferably monomer and dimer structures.

The PAEKs of this invention are characterized by a toughness measured as a tensile impact strength of greater than 50 ft-lbs/-in$^2$ and crystallinity characterized by a distinct crystalline melting temperature ($T_m$) which is at least about 100° C. greater than its second order glass transition temperature ($T_g$).

It should be understood that the crystalline block copolymers of this invention may involve randomization due to transetherification during the solution polymerization reaction. Ether links formed during polymerization are sufficiently reactive due to activation by adjacent ketone links to react with phenolic reactants and this leads to random chain scission at the ether links adjacent to the ketone links, and re-assembling. Ether links sandwiched between two ketone links are particularly susceptible to this scission reaction. This is well known in the art. See Atwood et al., British Polymer Journal, 1972, Vol.4, pp. 391-399; Atwood et al., Polymer, 1981, Vol. 22, August, pp. 1096-1103. The rate of transetherification, however, is low in comparison to that of a typical nucleophilic polycondensation reaction, hence, the use of appropriate starting materials leads to the solution-polymerized block polymers of this invention. On the other hand, when two precursor blocks are reacted via solution-polymerized transetherification to yield the block copolymer, the reaction can easily be stopped at the block copolymer stage prior to total randomization.

The solution-polymerized block polymers of this invention are distinctive from those in the prior art by virtue of their enhanced linearity. This results in polymers which posses maximum crystallinity, crystallization rates and low viscosity to high performance characteristics. The solution-polymerized block polymers of this invention are made at relatively low temperatures, typically not in excess of 300° C. even under the most aggressive polymerization conditions, and this is contrasted with temperatures of 400° C which are utilized in melt-polymerization procedures for chain extension of polyaryletherketones into polymer blocks (see European Pat. Application EP-125,816, supra). Consequently, solution polymerization proceeds with minimal branching and isomerization, resulting in a polymer which provides the most favorable property characteristics.

DETAILED DESCRIPTION OF THE INVENTION

There are many varieties of PAEKs and they are made by one of two processes, viz. electrophilic and nucleophilic aromatic substitution reactions. The former is mainly achieved through Friedel-Crafts catalysis and has the advantage of allowing the use of relatively low cost starting materials such as terephthaloyl chloride, diphenyl ether and phosgene, but suffers in the past from the necessity to employ corrosive solvents such as HF and the existence of too much branching in the polymer structure. Nucleophilic aromatic substitution, unfortunately, requires the use of expensive fluorine substituted monomers such as difluorobenzophenone to achieve PAEKs with desirable properties. Alternative routes or alternative structures which can lower the cost of manufacture and/or improve the polymer properties would provide great advantages.

As mentioned earlier, it was found possible to adjust the $T_g$ of the copolymers to tne desired level by the incorporation of units (1), (2), (3) and/or (4). Another facet of PAEK technology is that the crystalline melting point can be fairly accurately determined from the ether to keto (or ketone) ratio in the polymer. As the ratio goes up, the $T_m$ goes down. (There is a practical limit to a suitable $T_m$; that is the temperature at which the polymer must be molded and the degradation temperature of the polymer). If the molding temperature is at the degradation temperature and sufficient polymer flow is not obtainable below that temperature, then the PAEK's $T_m$ is too high. This means that the ether-to-keto ratio is too low and must be raised. Such can be achieved by increasing the ether containing and/or forming component in the polymer manufacture at the expense of the keto containing component. Increasing the ether content tends to increase the toughness of PAEKs and a dramatic alteration in the ether-to-keto ratio will provide noticeable changes in toughness. The tools for doing this are well within the capabilities of the skilled chemist knowledgeable of the techniques of electrophilic and nucleophilic aromatic substitution reactions. The displacement of these groups along the linear chain of the polymer is not believed to be narrowly critical to achieving the $T_m$ and $T_g$ properties.

THE FORMING REACTIONS

One of the attributes of this invention is that the ultimate block polymer will be made from a PAEK starter molecule (block precursor) which is oligomeric to significantly polymeric. As a rule, the PAEK starter molecule has a low enough molecular weight that is has a reduced viscosity below about 0.9 dl/g, as measured in concentrated sulfuric acid at 1 g/100 ml at 25° C. It is thus reacted with reactants which can form the other block or the chain extension between blocks by solution polymerization; indeed it is possible to combine the steps of block polymerization or of chain extension in the same solution polymerization reaction. In this way, a block polymer or a chain extended polymer having a reduced viscosity greater than 0.9 dl/gm (as measured in concentrated sulfuric acid at 1 g/100 ml at 25° C.) is obtainable.

An important step in the block polymer synthesis is the preparation of the precursor blocks. This can be done by any of the known solution-polymerization procedures for making PAEK, except that the stoichiometry is selected such that the precursor's molecular weight is controlled and the precursor is endcapped with functional groups available for block copolymerization/chain extension reactions. However, if transetherification is the preferred route to block polymer formation, then the precursor need not require the presence of functional capping groups as such. Thus, the precursor can be formed from conventional reactants and by using conventional methods.

For example, by the electrophilic aromatic substitution reaction, an acid halide can be reacted with a wholly functionally aromatic organic compound to produce a host of PAEK precursor molecules. With just two monomers and a capping agent, and using such a technique, a host of halide-terminated or oligomer precursors are possible. To illustrate this point, one may combine phosgene, diphenyl, terphenyl, naphthalene or anthracene and terephthaloyl halide, with the capping agent p-fluorobenzoyl chloride, into many unique combinations. For example* * In the above equations Ph is a phenyl or a 1,4-phenylene unit with the provision that where there are two carbonyl groups attached to the same phenyl ring, up to 50% of these groups may be in the 1,3 position to each other. Of course, some 1,2- and 1,3-phenylene units can also be formed in the electrophilic substitution process; Ph' is (1), (2), (3) and/or (4).

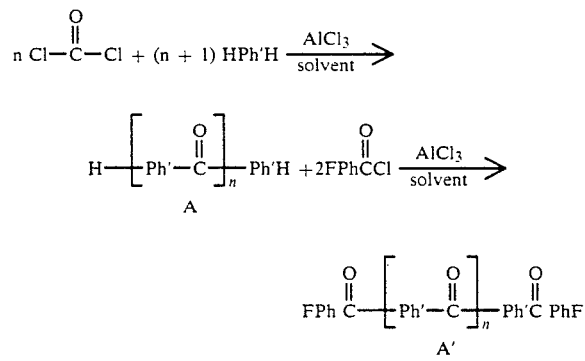

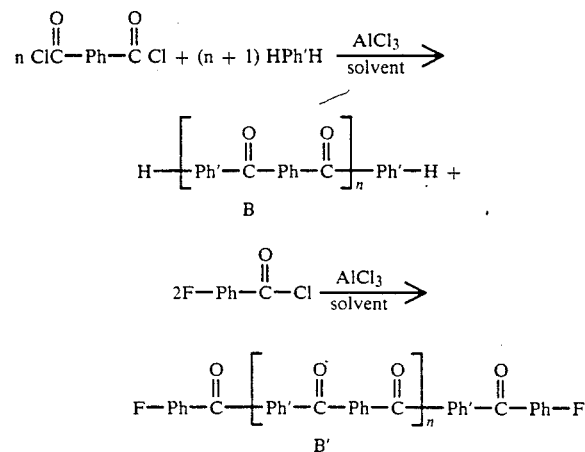

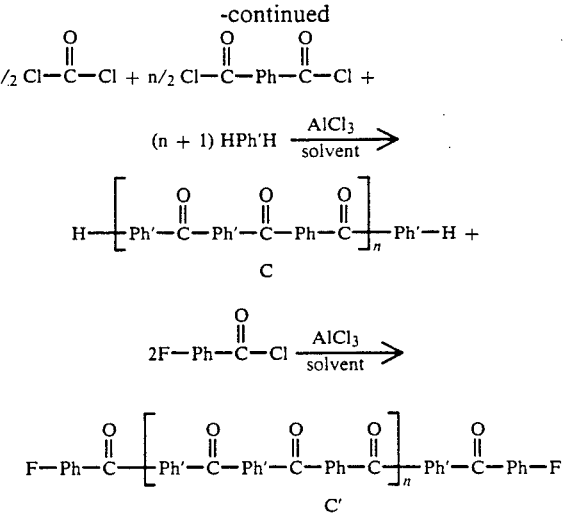

Reactions A-C can be performed by conducting the two Friedel-Crafts reactions separately. It is also possible, however, to charge all the reagents into the reactor at once, and to thus, obtain the dihalo-terminated oligomers in a single operation.

The above variety can be extended significantly by substituting part of the HPh'H with a host of other aromatic compounds, thus described by Dahl and Dahl et al., supra, such as diphenyl ether, diphenoxybenzene, diphenoxybenzophenone, 4,4'-diphenoxy biphenyl, 2,6-diphenoxynaphthalene, 1,5-diphenoxy anthracene, and the like. Obviously n need not be a very large number to provide a weight average molecular weight which achieves a reduced viscosity of 0 .9 dl/g or less.

The fact that very useful block polymers made by this invention can utilize lower molecular weight block precursors is most desirable especially when the precursor is made by the electrophilic aromatic substitution reaction as above described. Such lower molecular weight precursors are more readily washed of the catalyst such that the resulting block polymer is cleaner and less prone to unwanted branching reactions during the final polymerization to the block polymer. It is thus an important feature of this invention that one is able to utilize precursors made by the electrophilic process (e.g., Friedel-Crafts reaction). Polymers with unique structures, displaying excellent toughness and thermal stability can be prepared in this manner.

Moreover, since the precursor is not a very high molecular weight species, less stringent temperature conditions and thus even volatile solvents my be used to prepare such precursor. This in turn can result in such benefits as better color and less branching. Of course, crystallization will be an ever present problem, and temperature and solvent selection will be dictated by this factor if the molecular weight chosen for the precursor creates such a problem. Needless to say, the options available to achieve successful polymer formation are numerous and in no way confining to only the procedures of the prior art for making the polymers of the prior art.

However, what is most desirable from the standpoint of PAEK manufacture, is that much of the block polymer can be derived from low cost starting materials such as phosgene, biphenyl, terphenyl, naphthalene, anthracene, terephthaloyl chloride, and optionally diphenyl ether.

On the other hand, the block precursor may be made according, e.g., to Reactions A-C above without the fluorinated capping agent. In such a case, alteration in the stoichiometry will provide acyl halide end groups useful for further reactions. In summary, therefore, the precursors can be tailored such that the desirable block polymers can be formed by both electrophilic and nucleophilic aromatic substitution reactions. Thus, the variety of procedures for making the block polymers of this invention are many, and unconventional techniques may be avoided. For example, the precursors A', B', and C' prepared as shown above can be converted into block polymers using one or more of, for example, 4,4'-difluorobenzophenone, bis-p-(p-fluorobenzoyl) benzene, hydroquinone, 4,4-'-biphenol, terphenyl diol, naphthalene diol, and/or anthracene diol; viz:

It should be appreciated that transetherification as discussed above will make the simplistic characterization of the block polymers much more complex, but the overall block structure should prevail imposing a significant structural difference from the PAEKs of the prior art.

The block precursors A-C and A'-C' above can be reacted by a further electrophilic aromatic substitution reaction to produce block polymers of this invention. In the preferred practice of this invention, the block precursors are made by either electrophilic or nucleophilic aromatic substitution reactions and the final polymerization to the block polymer is accomplished by the nucleophilic route. An example wherein both processes are nucleophilic is shown below:

Reaction D

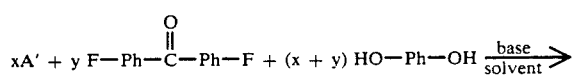

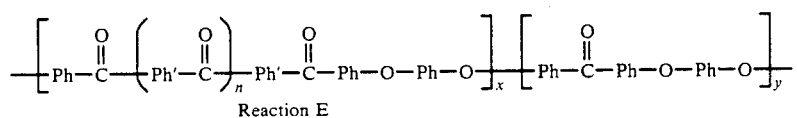

Reaction E

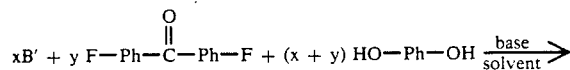

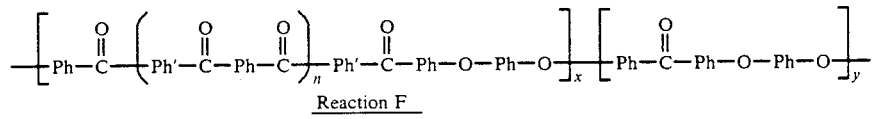

Reaction F

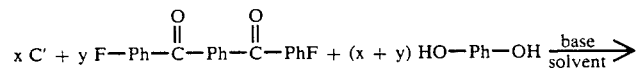

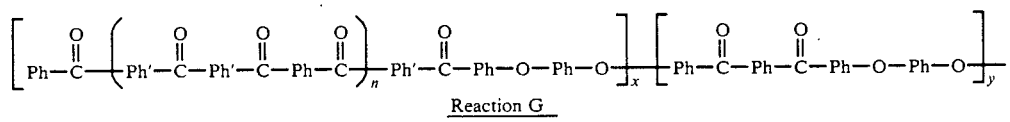

Reaction G

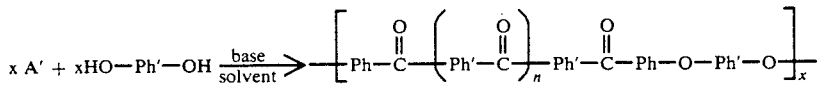

Reaction H

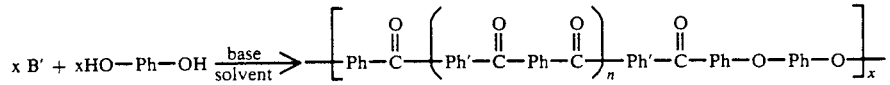

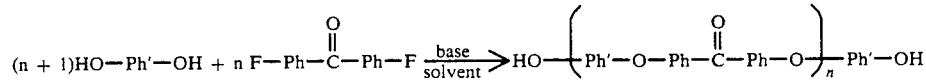

(IA), the oligomer.

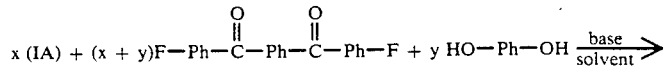

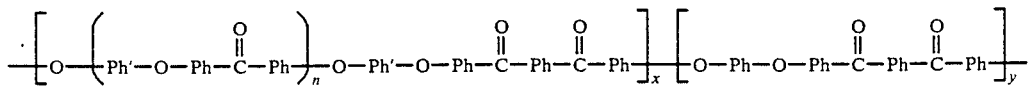

(IB), the block copolymer.

The two processes, i.e., the prepolymer formation and its polymerization to the final block- or chain-extended polymer can be performed as two separate steps or as a one-pot operation, wherein in the intermediate oligomer is not isolated.

In summary thus, the block and chain-extended polymers of the instant invention may contain any of the structures disclosed in U.S. Ser. No. 729,580 referrred to above, with the proviso, that at least one of the blocks and/or at least one of the chain-extending groups contain at least 50 mole percent of units (1), (2), (3) and/or (4), in lieu of units (5).

As mentioned previously, the oligomers should generally contain at least two mer units. The oligomers having repeating units (6), wherein X is halogen or hydroxyl,

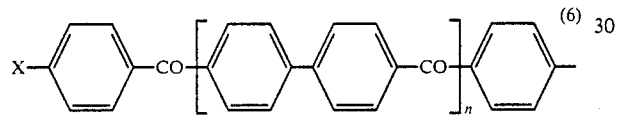

and n is 3 or less, are disclosed in U.S. Pat. 3,979,459. Aromatic polyketones and copolyketone/sulfones (ketone to sulfone ratios of 75/25 to 100/h) based on (6) are described in U. S. Pat. No. 3,928,295. The rather complicated method whereby these oligomers are prepared is not applicable to the preparation of higher molecular weight species, i.e., those where n>3. The utility of the oligomers is obviously fully realized at higher molecular weights, at which the increased block lengths lead to sufficiently fast crystallization rates, even though the glass transition temperatures of the segments are rather high. Hence, while the other biphenyl-, terphenyl, naphthalene and/or anthracene- based oligomers described herein, which contain repeating units of appreciably higher molecular weights than the molecular weight of the repeat unit of (6) are useful for the purposes of the instant invention even when n is only two, oligomers of the formula (6) are satisfactory at higher n values only, i.e., wherein n is at least 4 or higher. All of the oligomers can have molecular weights of up to about 10,000.

Biphenyl-drived poly(aryl ether ketones) are also described in European Patent Application 194,062. The materials claimed in the subject application are copolyketone/sulfones having improved glass transition temperatures. The presence of the $SO_2$ group which tends to break-up the crystallinity of the polymer is undesirable, however; properties that are inferior to those obtained with polymers having only ether and keto linkages, result.

4,4'-dihydroxybiphenyl derived random poly(aryl ether ketones) are described in European Patent Applications 182,648 and 184,458. U.S. reissue 29,489 claims halophenols of the general formula

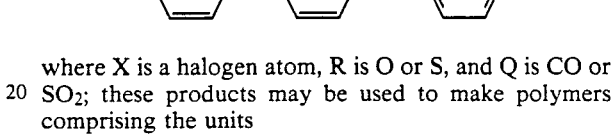

where X is a halogen atom, R is O or S, and Q is CO or $SO_2$; these products may be used to make polymers comprising the units

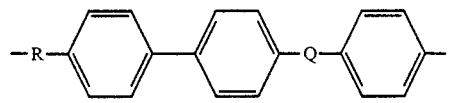

No block polymers or chain-extended polymers are mentioned, prepared or claimed, however.

Polymers obtained by the condensation of dihalobenzophenone with a dihydroxynaphthalene alkali metal salt are described in Japanese Patent Application 61/213,219. Again, no block polymers are described or claimed.

THE PAEK BLOCK PRECURSORS

The crystalline PAEK block precursors which are suitable for forming the block copolymer with the exception of the end blocking portion can be generically characterized as containing repeating units, exclusive of the terminating groups, of one or more of the following formulae:

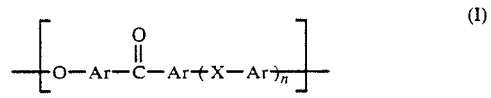

(I)

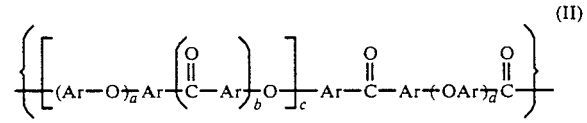

(II)

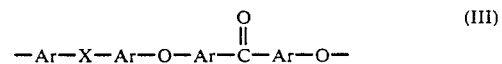

(III)

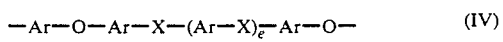

(IV)

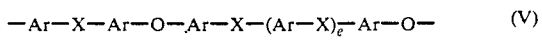

(V)

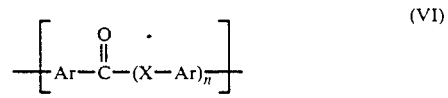

(VI)

wherein Ar is independently a divalent aromatic radical such as phenylene, biphenylene, terphenylene, naphthylene, or anthracenylene, X is independently O, or a direct bond and n is an integer of from 0 to 3, b, c, d and e are 0 to 1 and a is an integer of 1 to 4 and preferably d is 0 when b is 1. It should, of course, be borne in mind that oligomers corresponding to formula (6) must be at least tetramers.

Preferred block precursors include those having repeating units of the formulae below where Ar, Ph, and Ph' are as defined previously.

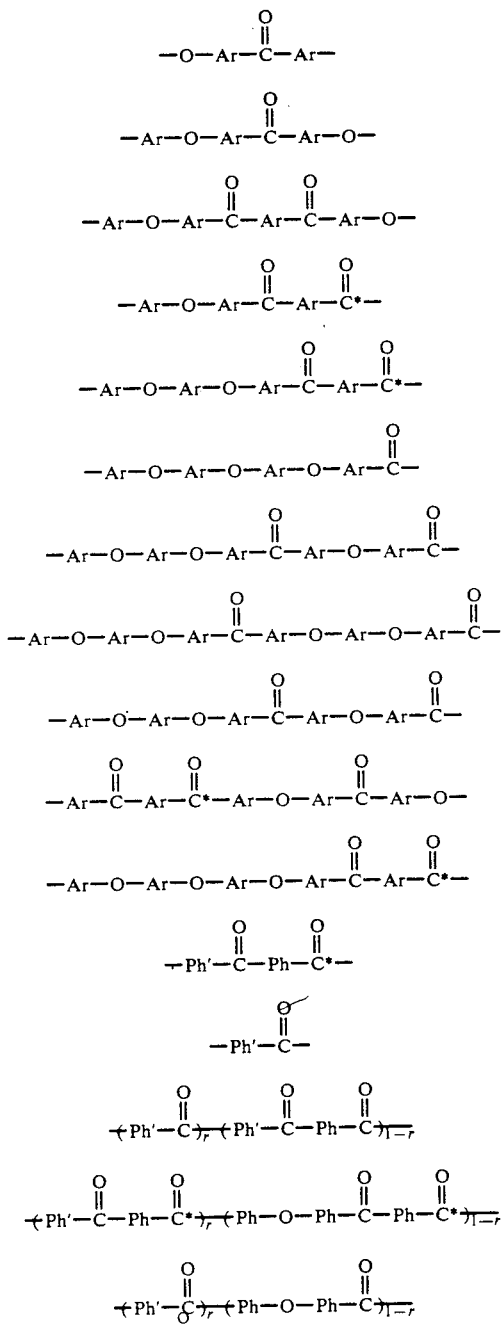

*Up to 50% of the two —C(=O)— units may be in the meta position when Ar = phenylene.

where r is less than one; and any other combinations of the units listed above.

The most preferred Ar radicals are (1), (2), (3), (4), and (5).

The nucleophilic method comprises heating a solution of a mixture of at least one bisphenol and at least one dihalobenzenoid compound and/or at least one halophenol compound in which the halogen atoms are activated by CO groups ortho or para thereto in an appropriate solvent and in the presence of a base such as an alkali carbonate as described in, for example, Canadian Patent No. 847 963 and U. S. Pat. No. 4,176,222. In making the precursor, one of the reactants is used in excess to provide a functional termminal group. The amount of such excess is used to control the molecular weight of the precursor. Alternatively, equimolar amounts of reactants can be used; in such case molecular weight (or extent of reaction) is controlled by stopping the reaction after a well-defined period of time or by using a well-defined amount of an appropriately functionalized terminator.

Preferred bisphenols in such a process include:
4,4'-dihydroxybiphenyl, 2,6-dihydroxy naphthalene, other isomeric dihydroxy naphthalenes, 1,5-dihydroxy anthracene, other isomeric dihydroxy anthracenes, dihydroxy terphenyls, 4,4'-dihydroxybenzophenone, and 4,4'-dihydroxydiphenyl ether.

Diphenols such as hydroquinone may also be used.

Preferred dihalobenzenoid and halophenol compounds include:
4-(4'-chlorobenzyl)phenol,
4-(4'-fluorobenzoyl)phenol,
4,4'-bis(4''-fluorobenzoyl)diphenyl,
1,5-bis(4'-fluorobenzoyl)naphthalene,
2,6-bis(4'-fluorobenzoyl)naphthalene,
2,7-bis(4'-fluorobenzoyl)naphthalene,
2,6- 2,7-bis(4'-fluorobenzoyul)anthracenes,
4,4'-difluorobenzophenone,
4,4'-dichlorobenzophenone,
4-chloro-4'-fluorobenzophenone,
1,4-bis(4'-fluorobenzoyl)benzene,
1,3-bis(4'-fluorobenzoyl)benzene, and
4,4'-bis(4''-fluorobenzoyl)diphenylether.

Also, PAEK block precursors such as those containing repeating units of the formula:

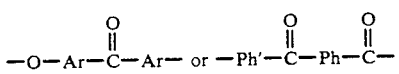

where Ar, Ph and Ph' are as defined previously, may be produced as described above by Friedel-Craft reactions utilizing hydrogen fluoride-boron trifluoride catalysts as described, for example, in U.S. Pat. Nos. 3,953,400; 3,441,538; 3,442,857 and 3,516,966.

Additionally, the precursors may be prepared by Friedel-Crafts processes as described in, for example, U.S. Pat. Nos. 3,065,205; 3,419,462; 3,441;538; 3,442,857; 3,516,966 and 3,666,612. In these patents, a PAEK is produced by Friedel-Crafts polymerization techniques using Friedel-Crafts catalysts such as aluminum trichloride, zinc chloride, ferric bromide, antimony pentachloride, titanium tetrachloride, etc. and a solvent.

The precursor may also be prepared according to the processes as described in, for example, U.S. Defensive Publication T-103,703 and U.S. Pat. No. 4,396,755. In such processes, reactants such as (a) an aromatic monocarboxylic acid; (b) a mixture of at least one aromatic dicarboxylic acid, and an aromatic compound, and (c)

combinations of (a) and (b) are reacted in the presence of a fluoroalkane sulphonic acid, particularly trifluoromethane sulphonic acid.

Additionally, PAEK block precursors of the following formulas:

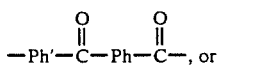

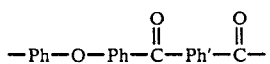

may also be prepared according to the process as described in U.S. Pat. No. 4,398,020. In such a process,
(a) a mixture of substantially equimolar amounts of
  i) at least one aromatic diacyl halide of formula

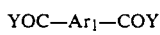

where —$Ar_1$— is a divalent aromatic radical, such as 1,4-phenylene; 4,4'-biphenylene, terphenylene, naphthylene, anthracenylene, and the like; Y is halogen, preferably chlorine, and COY is an aromatically bound acyl halide group, which diacyl halide is polymerizable with at least one aromatic compound of (a) (ii), and
  ii) at least one aromatic compound of the formula

wherein H—Ar'—H is an alomatic compound such as biphenyl, terphenyl, naphthalene, anthracene, or diphenyl ether, and H is an aromatically bound hydrogen atom, which compound is polymerizable with at least one diacyl halide of (a)(i), or
(b) at least one aromatic monoacyl halide of the formula

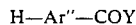

where H—Ar"-H is a divalent aromatic compound such as biphenyl, terphenyl, naphthalene, anthracene, diphenoxybiphenyl, diphenoxy-naphthalene, diphenoxy-anthracene, and diphenoxybenzene, and H is an aromatically bound hydrogen atom, Y is halogen, preferably chlorine, and COY is an aromatically bound acyl halide group, which monoacyl halide is self-polymerizable, or
(c) a combination of (a) and (b) is reacted in the presence of a fluoroalkane sulphonic acid.

In all of the electrophilic routes described above, the precursor molecular weight is controlled using known techniques. The preparation may, for example, be conducted in a solvent where precipitation takes place after a given molecular weight is reached. Control of the reaction time is another method to control precursor size. Many other methods exist and are well known to those skilled in the art.

The term PAEK as used herein is meant to include homopolymers, copolymers, terpolymers, graft copolymers, and the like, provided crystallinity of the PAEK is maintained. For example, any one or more of the units (I) to (VI) may be combined to form copolymers, etc.

THE BLOCK COPOLYMERS

The block copolymers may be depicted ideally as having the formula:

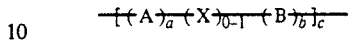

wherein the units A and B can be the same or different and are a crystalline poly(aryl ether ketone); these units are of the formulae shown previously; at least one of A, and/or B, and/or X must contain biphenyl, naphthalene, anthracene and/or terphenyl units; a and b are integers of at least 2 and preferably of at least 4, with the proviso that these integers are at least 4 when oligomers of formula (6) are used; c is an integer of 1 or greater, preferably from greater than 1 up to 100, and most preferably from 3 to 90 X is a monomeric —Ar'''—O— unit where Ar''' is a divalent arylene radical such as (1), (2), (3), (4), or phenylene; X can also be an oligomeric radical such as (Ar'''—O)$_n$ where n is at least two and can be up to about 50 and Ar''' is a divalent arylene group optionally containing carbonyl and/or ether functions in its structure, i.e., Ar''' can be, for example, 4,4'-biphenylene, terphenylene, naphthylene, anthracenylene; p-phenylene,

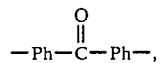

or —PhOPh—; finally X can be any other oligomer as described herein and in U. S. patent application Ser. No. 729,580. Where the blocks A and B are identical, X must be an oligomeric group.

The most preferred oligomers A and/or B useful for the purposes of the instant invention are listed below; Ph and Ph' are as defined previously.

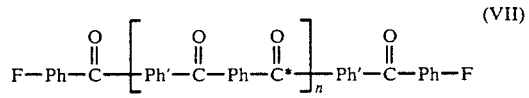
(VII)

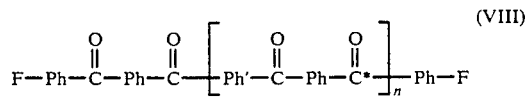
(VIII)

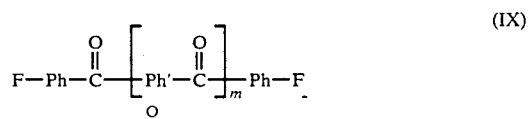
(IX)

*Up to 50% of the two —C— units may be in the meta position.

Other preferred structures are those wherein part of the Ph' is replaced by Ph—O-Ph and structures combining the units above, e.g.,

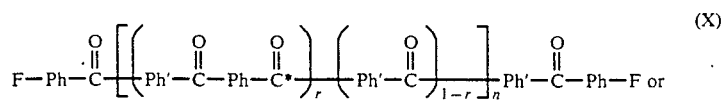
(X)

-continued

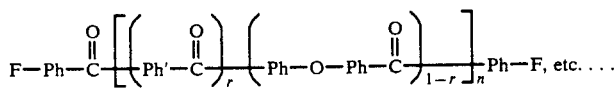
(XI)

In the formulae above n is at least 2, and m is at least 4; r is less than one. Additional preferred oligomers which may be used as either A or B are those described in U. S. patent application, Ser. No. 729,580.

PREPARATION OF THE BLOCK COPOLYMERS AND OLIGOMERS

The block copolymers of this invention may be prepared by one or more of the following solution polymerization processes. These processes utilize precursors prepared as described below:

STARTING MATERIALS (I) Functionalized Starting Materials Prepared Via the Nucleophilic Route (A) Hydroxyl-terminated Precursors The condensation of monomers such as listed above, i.e., the bisphenols and dihalobenzenoids with optionally added halophenols, can be made to yield hydroxyl-terminated oligomeric precursors. The conditions used for the preparation of these products are the same as set forth in the section titled "Situation I", infra, except that an appropriate excess of the hydroxyl co-reactant is used. The higher the excess of co-reactant, the lower the molecular weight of the resulting polymer. For example, a polymer having a number average molecular weight of about 5,000 is obtained when one mole of diphenol is reacted with about 0.92 moles of an activated dihalobenzenoid compound. A typical reaction is illustrated by the following wherein Ph and Ph' are as defined above.

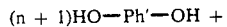

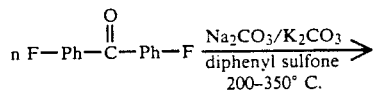

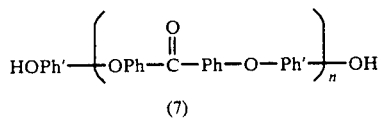

(7)

Another route to the hydroxyl-terminated precursor is the reaction of an activated halophenol with a diphenol as shown by the following:

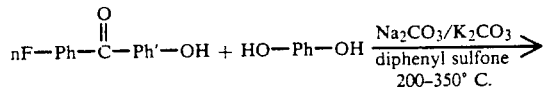

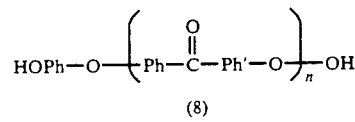

(8)

B. Halogen-Terminated Precursors

A similar condensation as described in (A) above is used except that an excess of the activated dihalobenzenoid compound is reacted. The preparation of the dihalo-terminated precursor is illustrated by the following:

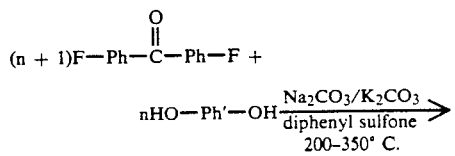

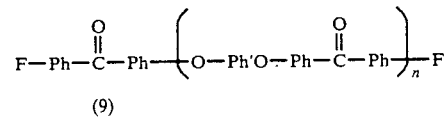

(9)

In another embodiment, the following approach may be used to make the dihalo-terminated oligomer:

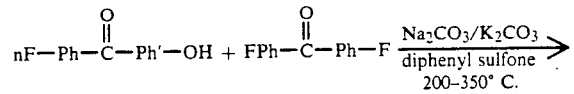

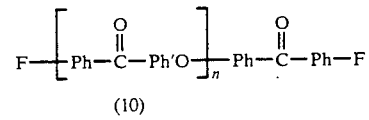

(10)

Since there may be some hydrolysis during the reaction, as shown above, total dihalo termination is accomplished by adding a small additional amount of the same dihalo compound (or optionally, any other activated dihalo compound) to the reaction mixture and heating for about 1 to 2 hours.

C. Halogen-hydroxy-terminated Precursors

These precursors may be prepared by any of the following methods:

i) Selective hydrolysis of one halo atom in (9) or (10) above, or ii) The reaction of equimolar amounts of diphenol and dihalo-compounds. In this case, reaction time is extremely important as it will eventually control the molecular weight of the precursor. The longer the reaction time, the higher the molecular weight of the precursor. Should hydrolysis occur, termination may be carried out, as described under (B) above (i.e., via the addition of additional dihalo-compound); or iii) The reaction of precursor (8) with a calculated amount of a dihalobenzenoid compound; or iv) The reaction of precursors (9) or (10) with a calculated amount of a diphenol compound. The reaction conditions are as described under Situation I, infra.

v) The self-condensation of a halophenol where, once again, the reaction time is very important since it will control the molecular weight of the precursor.

(II) Functionalized Materials Prepared Via The Electrophilic Route

(A) Halogen-terminated Presursors

The preparation of these materials is illustrated by the reaction of terephthaloyl chloride and for example, biphenyl as follows:

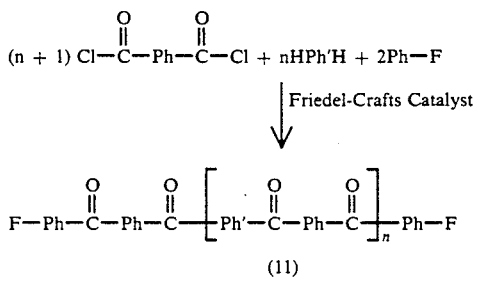

(11)

Another embodiment using the same monomers is illustrated as follows:

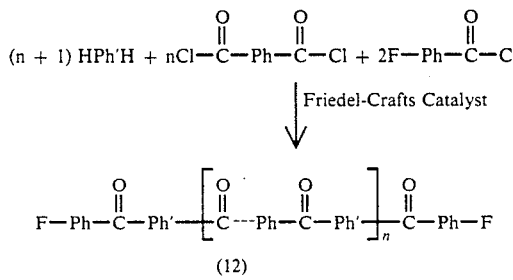

(12)

Still another example is provided by the reaction of phosgene with an equimolar mixture of biphenyl, terphenyl, naphthalene or anthracene with diphenyl ether:

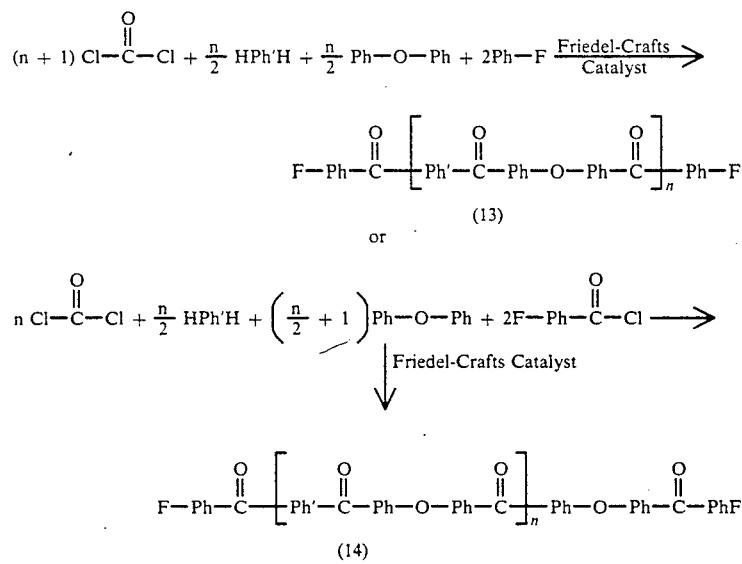

(13)

or (14)

Instead of using mixtures of phosgene and of H-Ph'-H or mixtures of phosgene and of diphenyl ether, compounds such as (15) and (16) may be employed.

(15)

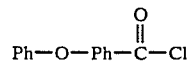

(16)

Thus the polyketone oligomers may be prepared by reacting an excess of either (i) or (ii):

(i) at least one electrophilic halo acylhalide or diacyl halide of the formula:

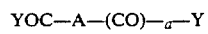

where —A— is a direct bond or a divalent aromatic radical, Y is halogen and —COY is an acylhalide group, a is 0 or 1, and when a is zero, A must be a direct bond; polymerizable with at least one aromatic compound of (ii) below, and (ii) at least one aromatic compound of the formula:

where —Ar'— is a divalent aromatic radical such as biphenylene, terphenylene, naphthylene, anthracenylene, diphenyl ether diyl, and the like, and H is an aromatically bound hydrogen atom, which compound is polymerizable with at least one halo acylhalide or diacyl halide of (i), above, accompanied or followed by the Friedel-Crafts reaction of the obtained intermediate with $Z-Ar_2H$ if excess of (i) is used, or with $Z-Ar_2COY$ if excess of (ii) is used. In the formulae above Z is halogen, preferably fluorine, Y is as described above and $Ar_2$ is a divalent, optionally alkyl or aryl substituted arylene group.

Specifically, the precursors may be prepared by reacting biphenyl, terphenyl, naphthalene, or anthracene, and, optionally, in addition to biphenyl, terphenyl, naphthalene, or anthracene, any of the well-known aromatic co-reactants such as diphenyl sulfide, dibenzofuran, diphenyl ether, thianthrene, phenoxathin, dibenzodioxine, phenodioxin, diphenylene, 4,4'-diphenoxybiphenyl, xanthone, 2,2'-diphenoxybiphenyl, diphenyl methane, 1,4-diphenoxybenzene, 1,3-diphenoxybenzene, 1-phenoxynaphthalene, 1,2-diphenoxynaphthalene, diphenoxybenzophenone, diphenoxy dibenzoyl benzene, 1,5-diphenoxynaphthalene, 1-phenoxyanthracene, 1,5-diphenoxyanthracene, 1,6-diphenoxyanthracene, and the like. Among these, diphenyl ether, 4,4'-diphenoxybiphenyl, diphenyl methane, 1,4-diphenoxy benzene, 4,4'-diphenoxy diphenyl ether, the mono- and the diphenoxynaphthalenes, and the mono- and the diphenoxyanthracenes are preferred.

Similarly, the following compounds are diacyl halides which may be used as reactants:
terphthaloyl chloride, isophthaloyl chloride,
thio-bis(4,4'-benzoyl chloride),
benzophenone-4,4'-di(carbonyl chloride),
oxy-bis(3,3'-benzoyl chloride),
diphenyl-3,3'-di(carbonyl chloride),
carbonyl-bis(3,3'-benzoyl chloride),
sulfonyl-bis(4,4'-benzoyl chloride),
sulfonyl-bis(3,3'-benzoyl chloride),
sulfonyl-bis(3,4'-benzoyl chloride),
thio-bis(3,4'-benzoyl chloride,
diphenyl-3,4'-di(carbonyl chloride),
oxy-bis[4,4'-(2-chlorobenzoyl chloride)],
naphthalene-1,6-di(carbonyl chloride),
naphthalene-1,5-di(carbonyl chloride),
naphthalene-2,6-di(carbonyl chloride),
oxy-bis[7,7'-naphthalene-2,2'-di(carbonyl chloride)],
thio-bis[8,8'-naphthalene-1,1'-di(carbonyl chloride)],
7,7'-binaphthyl-2,2'-di(carbonyl chloride),
diphenyl-4,4'-di(carbonyl chloride),
carbonyl-bis[7,7'-naphthalene-2,2'-di(carbonyl chloride)],
sulfonyl-bis[6,6'-naphthalene-2,2'-di(carbonyl chloride)],
dibenzofuran-2,7-di(carbonyl chloride),
anthracene-1,5-di(carbonyl chloride) and the like.

Illustrative of suitable acyldihalides include carbonyl chloride (phosgene), carbonyl bromide, carbonyl fluoride and oxaloyl chloride.

Preferably biphenyl, naphthalene, anthracene, and/or terphenyl containing optionally some diphenyl ether, diphenoxybenzene or diphenoxybiphenyl are reacted with terphthaloyl chloride, isophthaloyl chloride and/or phosgene.

Fluorobenzene and p-fluorobenzoyl chloride, as endcapping agents, have been selected for illustration purposes only. It should be noted that other similar aromatic compounds, e.g.

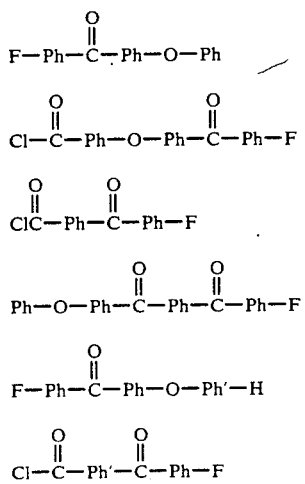

and materials wherein the fluoride is replaced by chloride, bromide, or nitro can be similarly used.

Fluorobenzene and p-fluorobenzoyl chloride are preferred. Self condensation of the following aromatic monoacyl halides $$H-Ar'-COY$$

wherein Ar' is a divalent aromatic radical such as 4,4'-biphenylene, naphthylene, anthracenylene, or terphenylene and H is an aromatically bound hydrogen atom, Y is as defined above, and COY is an aromatically bound acyl halide group which monoacyl halide is self-polymerizable, offers yet another route to these halo-terminated precursors. Note that mixtures of the above H—Ar'—COY wherein at least one Ar' is biphenylene, naphthylene, anthracenylene, or terphenylene, while the other(s) is (are) derived from any of the aromatic compounds listed above, such as, for example, diphenyl ether, may also be used. Typical examples follow (Ph and Ph' are as defined previously).

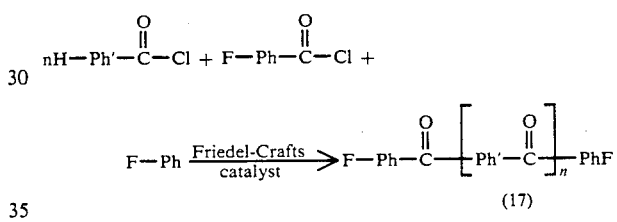

(17)

or

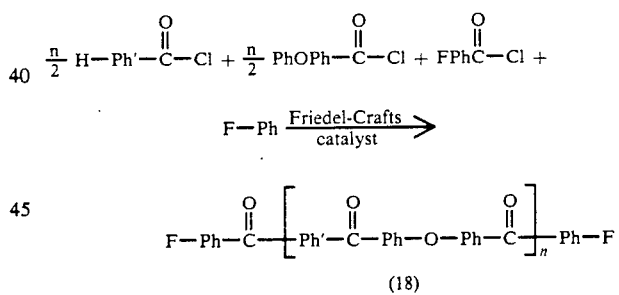

(18)

The preferred Friedel-Crafts catalysts are aluminum chloride, antimony pentachloride and ferric chloride. Other Friedel-Crafts catalysts, such as aluminum bromide, boron trifluoride, zinc chloride, antimony trichloride, ferric bromide, titanium tetrachloride, and stanic chloride, can also be used. In the preferred embodiment, excess of up to 100 mole percent of the acid catalyst is used.

The polymerization is generally carried out in the presence of a solvent. The preferred organic solvent is 1,2-dichloroethane. Other solvents such as symmetrical tetrachloroethane, o-dichlorobenzene, hydrogen fluoride, methylene chloride, trichloromethane, trichloroethylene, or carbon disulfide may be employed. Cosolvents such as nitromethane, nitropropane, dimethyl formamide, sulfolane, etc. may be used. Concentrations as low as 3 to as high as 40 weight percent may be used. Generally lower concentrations are preferred when high molecular weight polymers are being prepared.

Higher concentrations are preferably used when oligomers are prepared.

The reaction may be carried out over a range of temperatures which are from about −40° C. to about 160° C. In general, it is preferred to carry out the reaction at a temperature in the range of −10° to about 30° C. In some cases it is advantageous to carry out the reaction at temperatures above 30° C. or below −10° C. Most preferably, the reactions are carried out at temperatures below about 0° C. The reactions may be carried out at atmospheric pressure although higher or lower pressures may be used. Reaction times vary depending on the reactants, etc. Generally, reaction times of up to 6 hours and longer are preferred.

(B) Hydroxyl Terminated Precursors

Basic hydrolysis using methods known in the art (for example, in a mixture of dimethyl sulfoxide and water, diphenyl sulfone and water, aqueous amide aprotic solvents) of the dihalo oligomers yields the dihydroxy oligomers.

(C) Hydroxyl-Halogen-Terminated Precursors

Methods very similar to those described under (I)(C) are useful, i.e.,
  (i) partial hydrolysis of the dihalo-precursors,
  (ii) reaction of the dihalo-precursor with a diphenol under nucleophilic substitution conditions.
  (iii) reaction of the dihydroxy precursor with an activated dihalobenzenoid compound under conditions of nucleophilic substitution.

(III) Non-functionalized Precursors

Using the Friedel-Crafts reaction described above, nonfunctionalized precursors can be prepared. An example is shown:

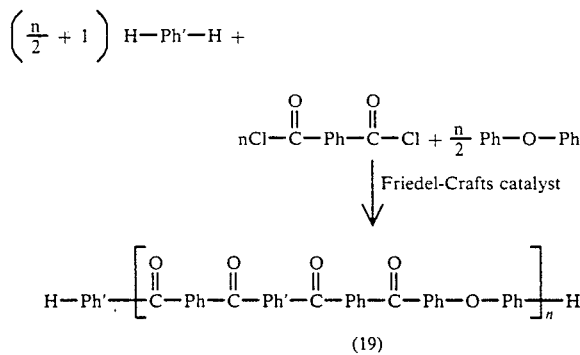

(19)

Another non-functionalized oligomer is, for example, (19a).

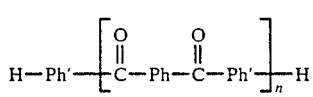

(19a)

Obviously, a wide variety of such oligomers are possible by the appropriate selection of the monomers listed above.

PREPARATION OF THE BLOCK COPOLYMERS

Situation (I)

The block copolymers may be prepared by a nucleophilic reaction between preformed precursors or polymers having mutually reactive groups as follows:

$$nA + nB \rightarrow (AB)_n$$

there may be more than two precursors or polymers, used to form the block copolymers, i.e.,:

$$nA + nB + nC \rightarrow (ABC)_n$$

The precursors or polymers may be illustrated by the following:

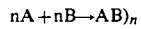

where X is a halogen attached to an aromatic carbon atom, preferably chlorine or fluorine; X is located in a position ortho or para to

and by

The reaction of these two precursors or polymers forms the block copolymer $(AB)_n$. Alternatively, the precursors or polymers may be illustrated by the following:

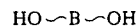

The condensation of the two blocks shown above leads to a block copolymer. In another alternative, two oligomers of the formulae

are condensed with a monomeric material, i.e.,

HO-monomer-OH to give the copolymer; or

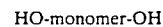

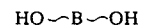

can be reacted with the dihalo-monomer

X-monomer-X to yield the copolymer.

If A and B are identical, their coupling (e.g., the last two cases) must be performed with a difunctional oligomeric agent, i.e.,:

or

Specific examples follow:

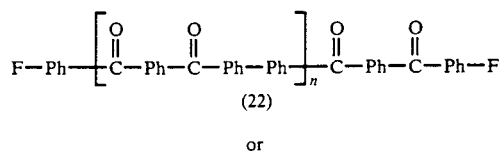

or

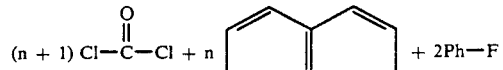

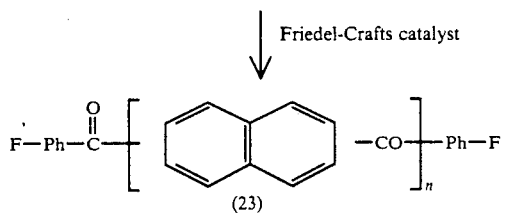

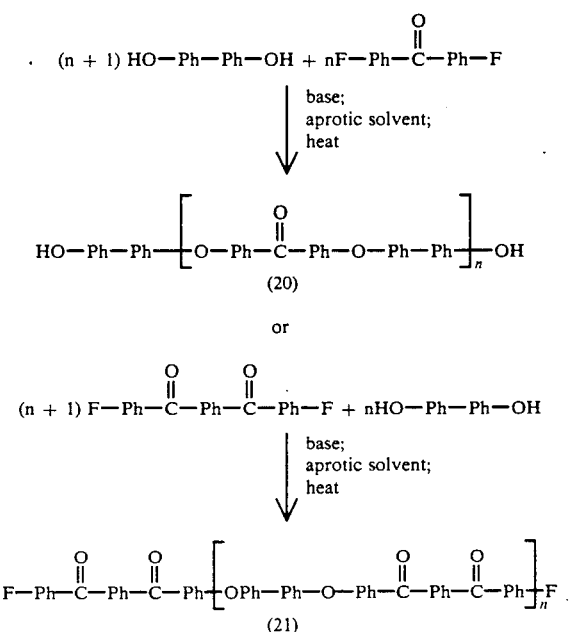

The preparation of oligomeric coupling agents is illustrated below:

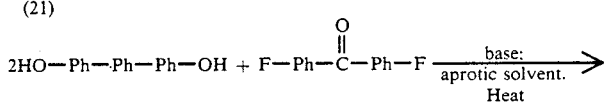

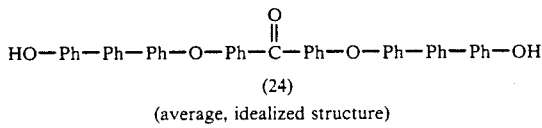

(average, idealized structure)

or

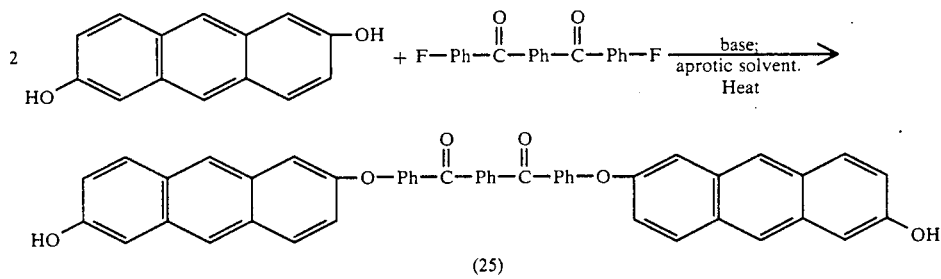

The equation below illustrates the coupling of two identical blocks using an oligomeric agent:

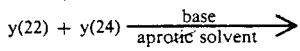

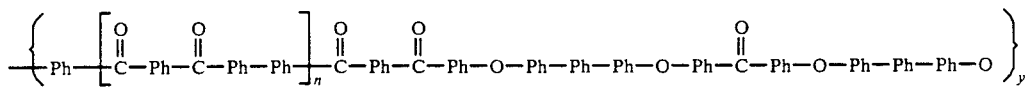

The precursors (20) and (21) are prepared using the nucleophilic route. Electrophilically prepared, fluorine-terminated starting materials are shown below:

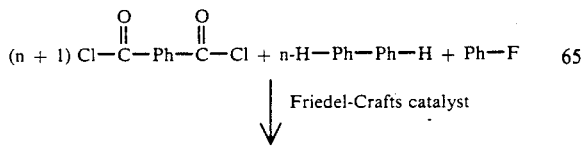

Other useful oligomers are, for example, (26), (27), and (28), all prepared nucleophilically, using an

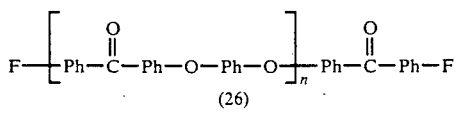

-continued

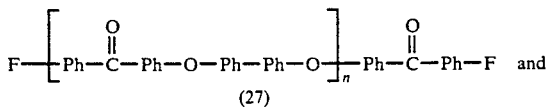

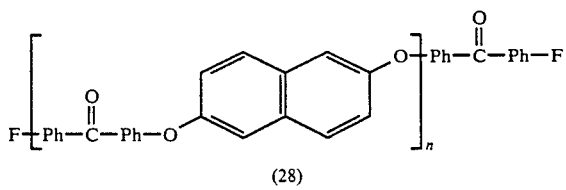

excess of 4,4′-difluorobenzophenone with hydroquinone, 4,4′-biphenol, and 2,6-naphthalenediol. The reaction of (26) with (27) or with (28), and an equimolar amount of either hydroquinone or 4,4′-dihydroxydiphenyl ether will yield coupled polymers having different blocks wherein one of the blocks does not contain a biphenyl, a naphthalene, an anthracene, or a terphenyl residue.

These nucleophilic polycondensation reactions are carried out by heating a mixture of the said precursor or precursors with the appropriate monomers (if required) at a temperature of from about 100° to about 400° C. The reactions are conducted in the presence of an alkali metal carbonate or bicarbonate. Preferably a mixture of alkali metal carbonates or bicarbonates is used. When a mixture of alkali metal carbonates or bicarbonates is used, the mixture comprises sodium carbonate or bicarbonate with a second alkali metal carbonate or bicarbonate wherein the alkali metal of the second carbonate or bicarbonate has a higher atomic number than that of sodium. The amount of the second alkali metal carbonate or bicarbonate is such that there is from 0.01 to about 0.25 gram atoms of the second alkali metal per gram atom of sodium. Of course, it is possible to use the preformed alkali metal salts of diphenols.

The higher alkali metal carbonates or bicarbonates are thus selected from the group consisting of potassium, rubidium and cesium carbonates and bicarbonates. Preferred combinations are sodium carbonate or bicarbonate with potassium carbonate or cesium carbonate.

The alkali metal carbonates or bicarbonates should be anhydrous although, if hydrated salts are employed, where the polymerization temperature is relatively low, e.g., 100° to 250° C. the water should be removed, e.g., by heating under reduced pressure, prior to reaching the polymerization temperature.

Where high polymerization temperatures (>250° C.) are used, it is not necessary to dehydrate the carbonate or bicarbonate first as any water is driven off rapidly before it can adversely affect the course of the polymerization reaction.

The total amount of alkali metal carbonate or bicarbonate employed should be such that there is at least one atom of alkali metal for each phenol group. Hence, when using an oligomeric diphenol there should be at least one mole of carbonate, or two moles of bicarbonate, per mole of the aromatic diol. Likewise where an oligomeric halophenol is employed there should be at least 0.5 mole of carbonate, or one mole of bicarbonate, per mole of the halophenol.

An excess of carbonate or bicarbonate may be employed. Hence there may be 1 to 1.2 atoms of alkali metal per phenol group. While the use of an excess of carbonate or bicarbonate may give rise to faster reactions, there is the attendant risk of cleavage of the resulting polymer, particularly when using high temperatures and/or the more active carbonates.

As stated above, the amount of the second (higher) alkali metal carbonate or bicarbonate employed, is such that there are 0.001 to about 0.2 gram atoms of the alkali metal of higher atomic number per gram atom of sodium.

Thus, when using a mixture of carbonates, e.g., sodium carbonate and cesium carbonate, there should be 0.1 to about 20 moles of cesium carbonate per 100 moles of sodium carbonate. Likewise, when using a mixture of a bicarbonate and a carbonate, e.g., sodium bicarbonate and potassium carbonate, there should be 0.05 to 10 moles of potassium carbonate per 100 moles of sodium bicarbonate.

A mixed carbonate, for example sodium and potassium carbonate, may be employed as the second alkali metal carbonate. In this case, where one of the alkali metal atoms of the mixed carbonate is sodium, the amount of sodium in the mixed carbonate should be added t that in the sodium carbonate when determining the amount of mixed carbonate to be employed.

Preferably, from 0.001 to 0.2 gram atoms of the alkali metal of the second alkali metal carbonate or bicarbonate per gram atom of sodium is used.

Where an oligomeric bisphenol and oligomeric dihalobenzenoid compound are employed, they should be used in substantially equimolar amounts. An excess of one over the other leads to the production of lower molecular weight products. However, a slight excess, up to 5 mole percent, of the dihalide or of the bisphenol, may be employed, if desired.

The reaction is carried out in the presence of an inert solvent. Preferably, the solvent is an aliphatic or aromatic sulphoxide or sulphone of the following formula

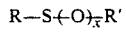

here x is 1 or 2 and R and R′ are alkyl or aryl groups and may be the same or different. R and R′ may together form a divalent radical. Preferred solvents include dimethyl sulphoxide, dimethyl sulphone, sulpholane (1,1 dioxothiolan), or aromatic sulphones of the formula:

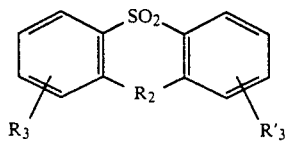

where $R_2$ is a direct link, an oxygen atom or two hydrogen atoms (one attached to each benzene ring) and $R_3$ and $R'_3$, which may be the same or different, are hydrogen atoms and alkyl or phenyl groups. Examples of such aromatic sulphones include diphenylsulphone, dibenzothiophen dioxide, phenoxathiin dioxide and 4-phenylsulphonyl biphenyl. Diphenylsulphone is the preferred solvent. Other solvents that may be used include benzophenone, N,N-dimethyl acetamide, N,N-dimethyl formamide and N-methyl-2-pyrrolidone.

The polymerization temperature is in the range of from about 100° to about 400° C. and will depend on the nature of the reactants and the solvent. The preferred temperature is above 270° C. The reactions are generally performed under atmospheric pressure. However, higher or lower pressures may be used.

For the production of some polymers, it may be desirable to commence polymerization at one temperature, e.g., between 200° and 250° C. and to increase the temperature as polymerization ensues. This is particularly necessary when making polymers having only a low solubility in the solvent. Thus, it is desirable to increase the temperature progressively to maintain the polymer in solution as its molecular weight increases.

To minimize cleavage reactions, it is preferred that the maximum polymerization temperature be below 350° C.

The polymerization reaction may be terminated by mixing a suitable end capping reagent, e.g., a mono or polyfunctional halide such as methyl chloride, difluorobenzophenone, monofluoro benzophenone, 4,4'-dichlorodiphenylsulphone with the reaction mixture at the polymerization temperature, heating for a period of up to one hour at the polymerization temperature and then discontinuing the polymerization.

This invention is also directed to an improved process for making the block and chain-extended polymers. Specifically, this process is directed to preparing poly(aryl ether ketone) precursors and the block polymers by the reaction of a mixture of at least one bisphenol and at least one dihalobenzenoid compound, and/or a halophenol to make the precursor, or the reaction of the precursors to make the block polymers either one or both in the presence of a combination of sodium carbonate and/or bicarbonate and an alkali metal halide selected from potassium, rubidium, or cesium fluoride or chloride, or combinations thereof.

The reaction is carried out by heating a mixture of one or more bisphenols and one or more dihalobenzenoid compounds and/or halophenols or the block precursors and other reactants, as described herein, at a temperature of from about 100° to about 400° C. The reaction is conducted in the presence of added sodium carbonate and/or bicarbonate and potassium, rubidium or cesium fluorides or chlorides. The sodium cabonate or bicarbonate and the chloride and fluoride salts should be anhydrous although, if hydrated salts are employed, where the reaction temperature is relatively low, e.g., 100° to 250° C., the water should be removed, e.g., by heating under reduced pressure, prior to reaching the reaction temperature.

Where high reaction temperatures (>250° C.) are used, it is not necessary to dehydrate the carbonate or bicarbonate first as any water is driven off rapidly before it can adversely affect the course of the reaction. Optionally, an entraining organic medium can be used to remove water from the reaction mixture such as toluene, xylene, chlorobenzene, and the like.

The total amount of sodium carbonate or bicarbonate and potassium, rubidium or cesium fluoride or chloride, or combinations thereof employed should be such that there is at least one atom of total alkali metal for each phenol group, regardless of the anion (carbonate, bicarbonate or halide). Likewise, where a halophenol is employed, there should be at least one mole of total alkali metal per mole of halophenol.

Preferably, from about 1 to about 1.2 atoms of sodium for each phenol group are used. In another preferred embodiment, from 0.001 to about 0.5 atoms of alkali metal (derived from a higher alkali metal halide) are used for each phenol group.

The sodium carbonate or bicarbonate and potassium fluoride are used such tht the ratio of potassium to sodium therein is from about 0.001 to about 0.5, preferably from about 0.01 to about 0.25, and most preferably from about 0.02 to about 0.20.

An excess of total alkali metal may be employed. Hence, there may be about 1 to about 1.7 atoms of alkali metal per phenol group. While the use of a large excess of alkali metal may give rise to faster reactions, there is the attendant risk of cleavage of the resulting polymer, particularly when using high temperatures and/or the more active alkali metal salts. In this respect, cesium is a more active metal and potassium is a less active metal so that less cesium and more potassium are used. Further, the chloride salts are less active than the fluoride salts so that more chloride and less fluoride is used.

Where a bisphenol and dihalobenzenoid compound are employed, they should be used in substantially equimolar amounts when maximum molecular weight is sought. However, a slight excess, up to 5 mole percent of the dihalide or of the bisphenol, may be employed if desired. An excess of one over the other leads to the production of low molecular weight products which can be desirable when the process is directed to making lower molecular weight PAEK, for example, the precursors for block polymer formation.

The reactions are carried out in the presence of an inert solvent. The solvents that are useful are the same as those described for the reactions utilizing sodium carbonate or bicarbonate in combination with a second alkali metal carbonate or bicarbonate.

The reaction temperature is in the range of from about 100° to about 400° C. and will depend on the nature of the reactants and the solvent. The preferred temperature is above 250° C. The reactions are preferably carried out at ambient pressure. However, higher or lower pressures can also be used. The reaction is generally caried out in an inert atmosphere.

For the production of some block polymers, it may be desirable to commence reaction at one temperature, e.g., between 200° and 250° C. and to increase the temperature as reaction ensues. This is particularly necessary when making high molecular weight polymers having only a low solubility in the solvent. Thus, there it is desirable to increase the temperature progressively to maintain the polymer in solution as its molecular weight increases.

This invention is also directed to an improved process for making the poly(aryl ether ketone) oligomers and the chain-extended and block polymers gel-free and at very high reaction rates. These polymerizations are performed in the presence of a base which is composed of sodium carbonate or bicarbonate and of a potassium, rubidium, or cesium salt of an organic acid.

Salts of any organic acid are useful. Thus, one may use the potassium, rubidium, or cesium salts of aliphatic linear or branched acids such as formic, acetic, propionic, butyric, isobutyric, pentanoic, hexanoic, heptanoic, octanoic, nonanoic, decanoic, 2-methyl-butyric, 3,4-dimethyl-pentanoic, 4,4-dimethyl hexanoic, 2-ethyl-3,4-dimethyl-heptanoic, 3-propyl-5,6-dimethyl nonanoic and other similar acids.

Salts of halo-substituted aliphatic acids such as monochloro-, dichloro-, and trichloroacetic, 2-chloropropionic, 3,5-dichloroheptanoic, bromacetic, 3-fluorobutyric, and 3,3,3-trichloropropionic acids.

Salts of aromatic mono- or polynuclear acids such as benzoic, toluic, 3,4-dimethylbenzoic, 2-chlorobenzoic, 3,4-dichlorobenzoic, 2-bromobenzoic, 2-chloro-4-methylbenzoic, 2-fluoro-3-ethylbenzoic, other alkyl and/or halo-substituted benzoic acids, the naphthalene carboxylic acids, alkylsubstituted naphthalene carboxylic acids such as 3-methylnaphthalene-1-carboxylic acid, 6-ethyl-naphthalene-2-carboxylic acid, halo-substituted naphthalene carboxylic acids such as 4-chloronaphthalene-2-carboxylic acid, phenanthrene and anthracene carboxylic acids and the like.

Salts of araliphatic acids such as phenylacetic, diphenyl acetic, 1-naphthyl acetic, 2-naphthyl-acetic, 4-chlorophenyl acetic, 4-methylphenyl acetic, 3-bromo-1-naphthyl acetic, 4-chloro-2-naphthyl-acetic, 3-(6-chloro-1-naphthyl)propionic, 3-(4-ethylphenyl)butyric, 3-methyl-4-(2-ethyl-4-chlorophenyl)butyric, 3-phenylhexanoic, and 7-phenylnonanoic acids.

Salts of heterocyclic carboxylic acids such as furane-2-carboxylic, furane-3-carboxylic, thiophene-2-carboxylic, thiophene-3-carboxylic, the pyridine, quinoline and isoquinoline carboxylic acids.

Salts of alkyl, aryl, and halo-substituted heterocyclic acids such as 2-methylfurane-3-carboxylic, 4-chloropyridine-2-carboxylic, 2-methyl-4-oxazole carboxylic and 2-propyl-pyrazine-3-carboxylic acids.

Salts of dicarboxylic acids such as oxalic, malonic, succinic, adipic, suberic, azelaic, α-bromo-glutaric, β, β'-dimethyl-glutaric, α, α'-dichlorosuberic, maleic and fumaric acids.

Salts of aromatic and heterocyclic dicarboxylic acids such as phthalic, isophthalic, terephthalic, naphthalene-1,2-dicarboxylic, naphthalene-2,3-dicarboxylic, naphthalene-1,5; 1,6; 1,7; 1,8; 2,4; 2,5; and 2,6-dicarboxylic, pyridine-2,3-dicarboxylic, furane-2,3-dicarboxylic acids and the like.

Salts of aliphatic, aromatic, and heterocyclic sulfonic and sulfinic acids such as methane sulfonic, ethane sulfonic, propane sulfonic, benzene sulfonic, benzene sulfinic, 1-naphthalene sulfonic, 2-naphthalene sulfonic, 1-naphthalene sulfinic, 1,8-naphthalene disulfonic, 2,6-naphthalene disulfonic, 4-methyl-benzene sulfinic, p-toluene sulfonic, 3,4-dichloro-benzene sulfonic, 6-chloro-naphthalene-1-sulfonic, quinoline-2-sulfonic, 4-pyridine sulfonic, 2-thiophene sulfonic, 3-thiophene sulfonic, 3-methyl-2-furane sulfinic, 3-propyl-2-furane-sulfonic acids and the like.

Salts of aliphatic, aromatic and heterocyclic phosphonic and phosphinic acids such as methane phosphonic, ethane phosphonic, benzene phosphinic, benzene phosphonic, 1-naphthalene phosphonic, 2-naphthalene-phosphonic, 1-naphthalene-phosphinic, 1,8-naphthalene diphosphonic, 2,6-naphthalene diphosphonic, 4-methyl-benzene phosphinic, 4-ethyl-benzene phosphonic, 3,4-dichloro-benzene phosphonic, 3,4-dibromobenzene phosphonic, 3-chloro-4-methyl benzene phosphonic, 6-chloro-1-naphthalene phosphonic, 2-quinoline-phosphonic, 2-thiophene phosphonic, 3-thiophene phosphonic, 3-thiophene phosphinic, 3-chloro-2-furane phosphinic, 3-propyl-2-furane phosphonic acids and the like.

Mixed salts such as for example, mixtures of potassium and rubidium acetates or mixtures of potassium acetate and potassium benzene sulfonate, and the like can also be used. The preferred salts are potassium formate, acetate, propionate, oxalate, benzoate, benzene sulfonate and p-toluene sulfonate.

The reaction is carried out by heating a mixture of one or more monomeric and/or oligomeric bisphenols and one or more monomeric and/or oligomeric dihalobenzenoid compounds and/or halophenols at a temperature of from about 100° to about 400° C. The reaction is conducted in the presence of added sodium carbonate and/or bicarbonate and potassium, rubidium or cesium salts of an organic acid, vide ultra. The sodium carbonate or bicarbonate and the organic salts should be anhydrous although, if hydrated salts are employed where the reaction temperature is relatively low, e.g., 100° to 250° C., the water should be removed, e.g., by heating under reduced pressure, prior to reaching the reaction temperature.

Where high reaction temperatures (>250° C.) are used, it is not necessary to dehydrate the carbonate or bicarbonate first, as any water is driven off rapidly before it can adversely affect the course of the reaction. Optionally, an entraining organic medium can be used to remove water from the reaction such as toluene, xylene, chlorobenzene, and the like.

The total amount of sodium carbonate and/or bicarbonate and potassium, rubidium or cesium organic salt employed should be such that there is at least one atom of total alkali metal for each phenol group, regardless of the anion (carbonate, bicarbonate and of the organic acid). Likewise, where a halophenol is employed, there should be at least one mole of total alkali metal per mole of halophenol.

Preferably, from about 1 to about 1.2 atoms of sodium for each phenol group is used. In another preferred embodiment, from 0.001 to about 0.5 atoms of alkali metal (derived from the alkali metal organic salt) is used for each phenol group.

The sodium carbonate or bicarbonate and the potassium organic salt are used such that the ratio of the potassium to sodium therein is from about 0.001 to about 0.5, preferably from about 0.001 to about 0.20 and most preferably from about 0.01 to about 0.1.

An excess of total alkali metal may be employed. Hence, there may be about 1 to about 1.7 atoms of alkali metal per phenol group. While the use of a large excess of alkali metal may give rise to faster reactions, there is the attendant risk of cleavage of the resulting polymer, particularly when using high temperatures and/or the more active alkali metal salts. Of course it is well known to those skilled in the art that cesium is a more active metal and potassium is a less active metal so that less cesium and more potassium are used. It is preferred that the ratio of carbonate and bicarbonate anions to the phenolic groups be about 0.5 to 1.0 respectively. However, higher and lower ratios are also possible.

Where a bisphenol and dihalobenzenoid compound are employed, whether monomeric or oligomeric, they should be used in substantially equimolar amounts when maximum molecular weight is sought. In other words, the total number of moles of phenolic groups should be the same as the total number of halo atoms. However, a slight excess of up to 5 mole percent of the dihalide or of the diphenol, may be employed if desired. An excess of one over the other leads to the production of low molecular weight products which is the case when oligomers useful for the copolymers of the instant invention are being prepared via the nucleophilic route.

The reaction is carried out in the presence of a solvent. The solvent is preferably an aliphatic or aromatic sulphoxide or sulfone of the formula

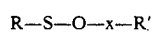

where x is 1 or 2 and R and R' are alkyl or aryl groups and may be the same or different. R and R' may together form a divalent radical. Preferred solvents include dimethyl sulphoxide, dimethyl sulphone, sulpholane (1,1 dioxothiolan), or aromatic sulphones of the formula

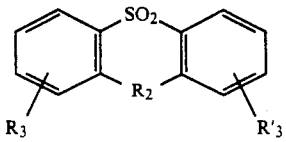

where $R_2$ is a direct link, an oxygen atom or two hydrogen atoms (one attached to each benzene ring) and $R_3$ and $R'_3$, which may be the same or different, are hydrogen atoms or phenyl groups. Examples of such aromatic sulphones include diphenylsulphone, ditolyl sulphone, tolylphenyl sulphone, dibenzothiophen dioxide, phenoxathiin dioxide and 4-phenylsulphonyl biphenyl. Diphenylsulphone is the preferred solvent.

The reaction temperature is in the range of from about 100° to about 400° C. and will depend on the nature of the reactants and solvent. The preferred temperature is above 250° C. The reactions are preferably carried out at ambient pressure. However, higher or lower pressures can also be used. The reaction is generally carried out in an inert atmosphere.

For the production of some poly(aryl ether ketones), it may be desirable to commence reaction at one temperature, e.g., between 200° and 250° C. and to increase the temperature as reaction ensues. This is particularly necessary when making high molecular weight polymers having only a low solubility in the solvent. Thus, there it is desirable to increase the temperature progressively to maintain the polymer in solution as its molecular weight increases.

Situation (II)

The block copolymers of this invention may be prepared by a nucleophilic polycondensation reaction between a precursor or polymer and one or more monomers.

The various combinations possible in this situation are illustrated below:

 II.a.

is reacted with

X monomer-X + HO-monomer—OH to give the block copolymer; or

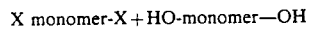 II.b.

is reacted with

X monomer-X + HO-monomer—OH to yield the block copolymer.

II.c Still another possibility is the following:

is reacted with

X-monomer—OH

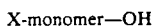

or

is reacted with

X-monomer-X and

HO-monomer—OH or

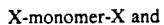

is reacted with

X-monomer—OH or 

is reacted with

X-monomer—OH.

II.d. Triblock copolymers could, for instance, be obtained via the route shown:

Diblock copolymers will be obtained via the above scheme if A and B have the same composition, or if the polymer block obtained from X-monomer—OH is identical to one of the precursors.

Numerous other possibilities that are obvious to those skilled in the art exist.

Additionally, the block copolymer may be prepared from a preformed polymer and an aligomer via coupling and transetherification. The process conditions in Situation II are the same as discussed for Situation I.

Situation (III)

The block copolymers of this invention may also be prepared by the Friedel-Crafts (electrophilic) polymerization techniques as fully described above. The preparation of a block copolymer $(AB)_n$ based on biphenyl (H-PH-PH-H), dephenyl ether and terphthaloyl chloride is illustrated in (a) below; a similar block copolymer made from phosgene and from terphthaloyl chloride is shown in (b).

(a) Step 1.

↓ Friedel-Crafts catalyst

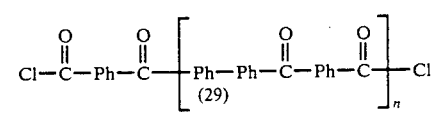

an acid chloride terminated oligomer (a) Step 2.

-continued $$\text{Oligomer (29)} + \text{Ph}-\text{O}-\text{Ph} + \text{Cl}-\overset{\overset{\text{O}}{\|}}{\text{C}}-\text{Ph}-\overset{\overset{\text{O}}{\|}}{\text{C}}-\text{Cl}$$

one block        second block

↓ Friedel-Crafts catalyst $(AB)_n$
Block polymer (b) Step 1.

$$n\ \text{Cl}-\overset{\overset{\text{O}}{\|}}{\text{C}}-\text{Cl} + (n+1)\ \text{HPh}-\text{Ph}-\text{H}$$

↓ Friedel-Crafts catalyst $$\text{H}-\text{Ph}-\text{Ph}-\left(\overset{\overset{\text{O}}{\|}}{\text{C}}-\text{Ph}-\text{Ph}\right)_n\text{H}$$

(30)
"hydrocarbon-terminated" oligomer.

(b) Step 2.

$$\text{Oligomer (30)} + \text{Cl}-\overset{\overset{\text{O}}{\|}}{\text{C}}-\text{Ph}-\overset{\overset{\text{O}}{\|}}{\text{C}}-\text{Cl} + \text{Ph}-\text{O}-\text{Ph}$$

one block        second block

↓ Friedel-Crafts catalyst $(CD)_n$
Block Copolymer.

The acid chloride terminated oligomer (31) and the "hydrocarbon terminated oligomer (32) are used similarly to form the analoguous naphthalene-containing block copolymers.

$$\text{Cl}-\overset{\overset{\text{O}}{\|}}{\text{C}}-\text{Ph}-\overset{\overset{\text{O}}{\|}}{\text{C}}-\left[\text{naphthalene}-\overset{\overset{\text{O}}{\|}}{\text{C}}\right]_n-\text{Cl}$$
(31)

$$\left[\text{naphthalene}-\overset{\overset{\text{O}}{\|}}{\text{C}}-\text{naphthalene}\right]_n-\text{H}$$
(32)

In all cases steps 1 and 2 can be performed separately or in a one-pot operation.

Situation IV

Poly(ether ketone) based block copolymers can be prepared using the non-functionalized oligomers such as (19) or (19a) for example. Both nucleophilic and electrophilic (Friedel-Crafts) condensations are possible.

(a). The Nucleophilic Polycondensation

The solution condensation of hydroquinone and 4,4'-difluorobenzophenone in the presence of oligomer (19) will yield a copolymer due to a transetherification process accompanying polymer formation. This is schematically represented as follows:

$$(19) + y\text{HOPhOH} + y\text{F}-\text{Ph}-\overset{\overset{\text{O}}{\|}}{\text{C}}-\text{Ph}-\text{F} \xrightarrow[\text{diphenyl sulfone;}]{\text{Na}_2\text{CO}_3/\text{K}_2\text{CO}_3}$$
heat Block Copolymer.

There are numerous possibilities for reagent selection; hence, the number of structures that are available is very wide.

(b). Electrophilic (Friedel-Crafts) Polycondensation

Oligomers (19), (19a), or any other non-functional oligomer of the formula $$\text{Ar}_3-\text{CO}(\text{Ar}-\text{CO}-\text{Ar}')_{\overline{n}}\text{H}$$

wherein Ar and Ar' are divalent aromatic radicals as previously defined; $Ar_3$ is a monovalent aromatic group such as phenoxyphenyl or biphenylyl and the like; can be condensed in a Friedel-Crafts reaction with a reactive aromatic hydrocarbon and a dicarboxylic acid or dicarboxylic acid halide. Two illustrative examples are shown:

$$(i)\ \text{Ar}_3-\text{CO}(\text{Ar}-\text{CO}-\text{Ar}')_{\overline{n}}\text{H} + \text{Cl}-\overset{\overset{\text{O}}{\|}}{\text{C}}-\text{Ph}-\overset{\overset{\text{O}}{\|}}{\text{C}}-\text{Cl} +$$

PhOPh—Ph—OPh where $Ar_3$ = H—Ph—Ph; Ar = Ph;
Ar' = Ph—O—Ph

↓ HF | BF₃

Block Copolymer.

$$(ii)\ \text{Oligomer (19a)} + \text{Cl}-\overset{\overset{\text{O}}{\|}}{\text{C}}-\text{Cl} +$$

Ph—O—Ph $\xrightarrow{\text{Friedel-Crafts catalyst}}$ Block polymer.

Obviously, once again, numerous possibilities exist and are obvious to those skilled in the art.

The copolymers of this invention may include mineral fillers such as carbonates including chalk, calcite and dolomite; silicates, including mica, talc, wollastonite; silicon dioxide; glass spheres; glass powders; aluminum; clay; quartz; and the like. Also, reinforcing fibers such as fiberglass, carbon fibers, organic polyamide fibers, and the like may be used. The copolymers may also include additives such as titanium dioxide; thermal stabilizers, ultraviolet light stabilizers, processing aids, plasticizers, and the like.

The copolymers of this invention may be fabricated into any desired shape, i.e., moldings, coatings, films, or fibers. They are particularly desirable for use as electrical insulation for electrical conductors.

Also, the copolymers may be woven into monofilament threads which are then formed into industrial fabrics by methods well known in the art as exemplified by U.S. Pat. No. 4,359,501. Further, the copolymers may be used to mold gears, bearings and the like.

EXAMPLES

The following examples serve to give specific illustrations of the practice of this invention but they are not intended in any way to limit the scope of this invention.

EXAMPLE 1

Preparation of a difluoro-terminated biphenyl-based poly(aryl ketone) oligomer via the electrophilic route.

A 500 ml 4-necked flask was fitted with a mechanical stirrer, reflux condenser, thermometer, nitrogen sparge, solids addition funnel and gas outlet tube connected to an aqueous sodium hydroxide trap. The apparatus was charged with 217.0 ml of 1,2-dichloroethane,
37.01 g (0.24 moles) of biphenyl,
40.60 g (0.20 moles) of terephthaloyl chloride, and
12.68 g (0.008 moles) of p-fluorobenzoyl chloride.

The mixture was cooled to 0° C. as 89.60 g (0.67 moles) of aluminum trichloride was added at such a rate as not to exceed 5° C. After 6 hours at 0° C, the reaction mixture was coagulated into 500 ml of preheated (to 80° C.) water. The slurry was then heated to 100° C., stirred for 15 minutes, filtered, and the precipitate washed with water (twice; each wash: 300 ml of water, 5 minutes) and once with methanol (300 ml, 5 minutes). The final purification was achieved by reslurrying the material in refluxing methanolic hydrogen chloride (567 ml of methanol and 33 ml of concentrated HCl) for 1.5 hours, followed by filtration and washing with water (twice, 300 ml each time, 5 minutes) and with methanol (300 ml, 5 minutes). The final oligomer, having the structural formula shown, had a reduced viscosity of 0.16 dl/g (1 g/100 ml concentrated sulfuric acid, at 25° C.).

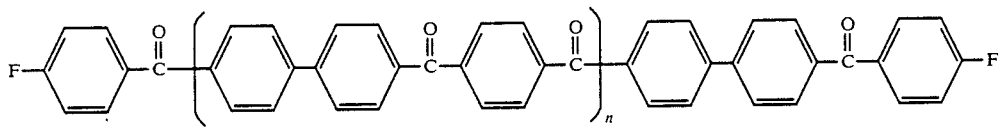

EXAMPLE 2

Nucleophilic preparation of a dihydroxy-terminated oligomer and its coupling to a block copolymer A 250 ml flask was fitted with a mechanical stirrer, thermocouple, nitrogen sparge, Claisen adapter, Dean-Stark trap and a pressure equalizing dropping funnel. The apparatus was charged with 68.00 g of diphenyl sulfone,
3.30 g (0.030 moles) of hydroquinone,
5.89 g (0.027 moles) of 4,4'-difluorobenzophenone,
6.16 g (0.058 moles) of sodium carbonate,
0.42 g (0.003 moles) of potassium carbonate, and
25 ml of xylene.

The atmosphere in the apparatus was evacuated and the apparatus was charged with nitrogen. This operation was repeated three times. A flow of nitrogen was maintained in the apparatus throughout the experiment. The mixture was heated to 200° C. for 30 minutes, then to 250° C. for 30 minutes and finally to 300° C. After one hour, a sample was taken followed by the addition of 5.59 g (0.030 moles) of 4,4'-biphenol and 10.64 g (0.033 moles) of 1,4-bis(p-fluorobenzoyl)benzene. After 15 minutes the reaction mixture was poured hot from the reactor, allowed to solidify and ground finely. The product was refluxed in acetone (2 times; 200 ml of acetone used each time; reflux time: 1.5 hours); water (2 times, 700 ml of water used each time; reflux time: 1.5 hours), and again once in acetone (700 ml of acetone, 1.5 hours). The sample taken prior to the addition of 4,4'-biphenol and 1,4-bis(p-fluorobenzoyl)benzene was worked-up in a similar manner. The reduced viscosities of the sample and of the final polymer (1g/100 ml concentrated $H_2SO_4$; 25° C.) were 0.35 and 0.51, respectively.

DSC analysis of the block polymer (rate of heating = 10° C. per minute) indicated that the material had, as expected, two melting points, at 323.4° C. and at 420.8° C., respectively.

What is claimed is:

1. A bis(acid chloride)-terminated poly(aryl ketone) oligomer having at least three repeating units comprising one or more divalent aromatic radical indepenently selected from the group consisting of biphenylene, terphenylene, naphthylene and antracenylene having a number average molecular weight below about 10,000.

2. A bis(acid chloride)-terminated oligomer as defined in claim 1 of the following formula:

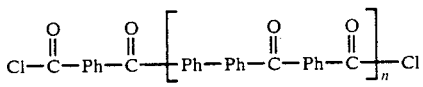

where Ph is 1,4-phenylene with the proviso that where there are 2 carbonyl groups attached to the same Ph, up to 50 mol % of these groups can be in the 1,3 position to each other, where n is an integer larger than 1.

3. A bis(acid chloride)-terminated oligomer as defined in claim 1 of the following formula:

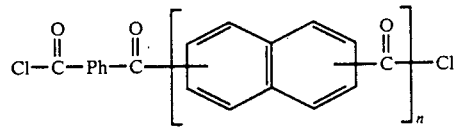

where Ph is 1,4-phenylene with the proviso that where there are 2 carbonyl groups attached to the same Ph, up to 50 mol % of these groups can be in the 1,3 position to each other, where n is an integer larger than 1.

* * * * *